United States Patent Office  3,567,831
Patented Mar. 2, 1971

3,567,831
PHARMACEUTICAL COMPOSITIONS CONTAINING 2,2,5,5-TETRAKIS(POLYFLUOROMETHYL) IMIDAZOLIDINES AND IMIDAZOLINES AND METHODS OF USING SUCH
William J. Middleton, Wilmington, Del., assignor to E. I. du Pont de Nemours and Company, Wilmington, Del.
No Drawing. Division of application Ser. No. 521,317, Feb. 9, 1966, now Patent No. 3,459,766, which is a continuation-in-part of application Ser. No. 461,151, June 3, 1965, which in turn is a continuation-in-part of application Ser. No. 439,476, Mar. 12, 1965. This application Apr. 17, 1969, Ser. No. 817,201
Int. Cl. A61k 27/00
U.S. Cl. 424—273                           18 Claims

ABSTRACT OF THE DISCLOSURE

Described and claimed are pharmaceutical compositions containing psychotropic or muscle-relaxant 2,2,5,5-tetrakis(polyfluoromethyl)imidazodilines and imidazolines of my copending Ser. No. 521,317, and the use of the pharmaceutical compositions.

RELATED APPLICATIONS

This application is a division of my copending application S.N. 521,317 filed Feb. 9, 1966, now U.S. Pat. No. 3,459,766, which itself is a continuation-in-part of my application S.N. 461,151 filed June 3, 1965, now abandoned, and which in turn was a continuation-in-part of my application S.N. 439,476 filed Mar. 12, 1965, now abandoned.

BACKGROUND OF THE INVENTION

Field of the invention

This invention relates to, and has as its principal objects provision of, novel pharmaceutical compositions and their use.

Prior art

My copending application Ser. No. 521,317, of which this is a division, discloses novel compounds which are the 4-imino-2,2,5,5-tetrakis(polyhalomethyl)imidazolidines, their isomeric or tautomeric forms, the 4-amino-2,2,5,5-tetrakis(polyhalomethyl)-3-imidazolines, and selected derivatives of the same. Formulas for these compounds wherein any halogen is chlorine or fluorine can be written as:

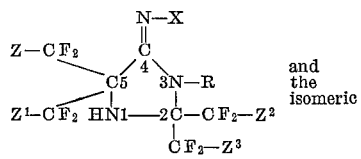

I. Imidazolidine Form

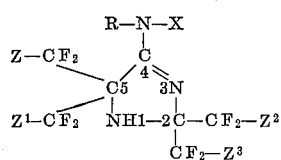

II. Imidazoline Form wherein:
(A) R is hydrogen or alkyl;
(B) X is selected from the group consisting of:
—C(CF$_3$)$_2$NH$_2$; hydrogen; alkyl; benzyl; carbethoxymethyl; lower alkenyl; dimethylaminoethyl; lower alkynyl; cyclohexyl; cyclohexenyl; lower alkyl substituted with 1 halogen or 1 lower alkoxy;

hydroxymethyl; hydroxymethoxymethyl; N-pyrrolidylmethyl; N-piperidylmethyl; N-morpholinylmethyl; or dimethylaminomethyl;

where Q is alkyl; lower alkyl substituted with up to 3 halogen or 1 lower alkoxy; phenyl; phenyl substituted with up to 3 halogen, 2 lower alkyl, 1 lower alkoxy, 1 amino or 1 lower alkyl-substituted amino; 2,4-dichlorophenoxymethyl; lower alkenyl; naphthyl; or amino(lower alkyl) or alkyl-substituted amino(lower alkyl) where the substituents are alkyl of 1–4 carbons;

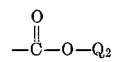

where Q$^2$ is lower alkyl; cyclohexyl; or

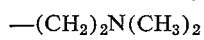

and
(C) Z, Z$^1$, Z$^2$ and Z$^3$, alike or different, are selected from the group consisting of hydrogen and fluorine; and
(D) with the proviso that R and X together are of no more than 30 carbons.

Compounds of the above structure in which R is H and X and Z are as previously defined are tautomers, and existing tautomeric equilibrium, especially in solution, as shown by the following formulas.

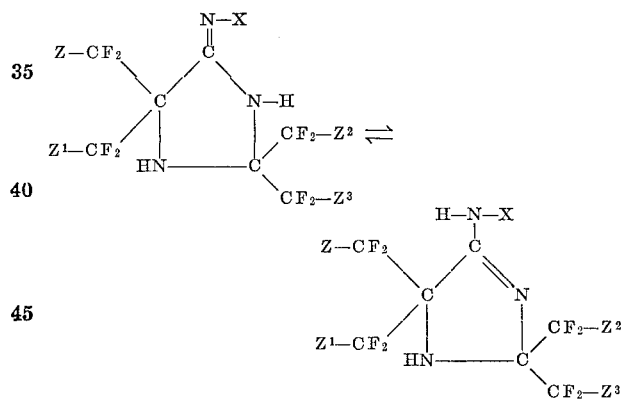

As would be expected from this tautomeric equilibrium involving a mobile proton, these compounds have marked acidic properties. For example, this hydrogen will exchange rapidly with deuterium when D$_2$O is added to an acetone solution of the compound, as evidenced by the disappearance of the NH absorption band in the nuclear magnetic resonance spectrum.

In the special case of 4-imino-2,2,5,5-tetrakis(trifluoromethyl)imidazolidine and 4-amino-2,2,5,5-tetrakis(trifluoromethyl)-3-imidazoline in which both R and X are H, and all Z's are F, these two hydrogens exchange with each other so rapidly that only a single absorption band is observed at 25° C. from these protons in the N.M.R. spectrum; and they both exchange rapidly with D$_2$O. As a practical matter these two tautomers normally exist together so that when one or the other is mentioned it is understood that the mixture of the two is included.

Since compounds of types I and II in which R is H exhibit acidic properties, they can form salts with bases. The salts from the two tautomers are identical, for their anions can be represented by the following resonance forms corresponding to the tautomeric forms of types I and II.

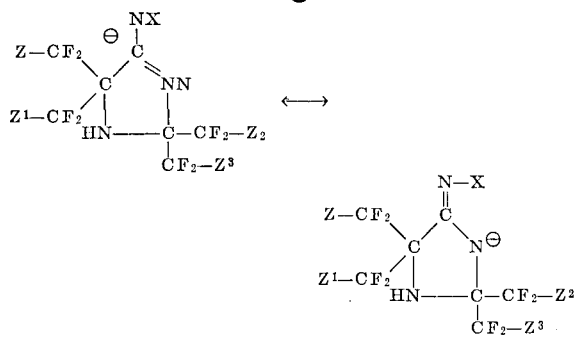

For example, 4 - imino-2,2,5,5-tetrakis(trifluoromethyl)-imidazolidine is a weak acid. It can be titrated with a strong base, such as tetramethylammonium hydroxide, in a nonaqueous solvent such as pyridine, to give a sharp end-point. The salt formed in this titration can be represented by the resonance structures:

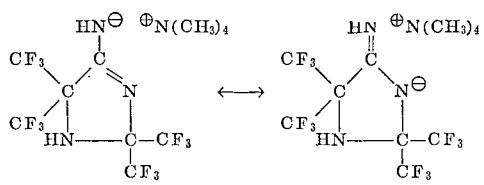

4 - acetylimino - 2,2,5,5 - tetrakis(trifluoromethyl) imidazolidine (R=H, X=CH$_3$CO—, and all Z's=F) is a stronger acid. It can be titrated in water with sodium hydroxide to give a salt that can be represented by the resonance structures:

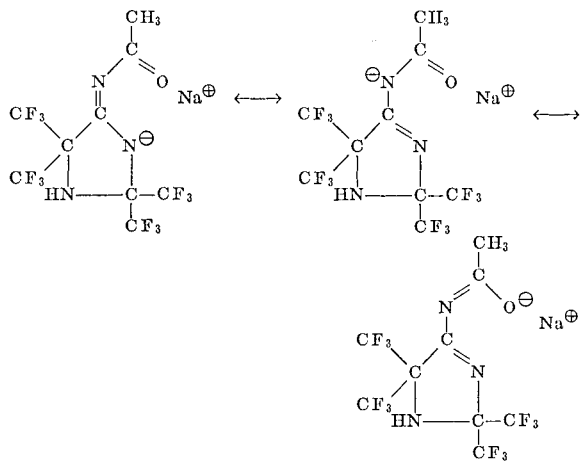

Compounds of the above general formula in which neither R nor X is H exist as isomeric structures similar to types I and II above. Either one or both types of these compounds can be prepared in a single reaction by causing a tautomeric mixture, in which R is H or R and X both are H, to react with an alkylating or acylating reagent. For example, a dimethyl derivative corresponding to type I (R and X=CH$_3$) and a dimethyl derivative corresponding to type II (R=X=CH$_3$ and all Z's=F) can be prepared in a single reaction by treating 4-imino-2,2,5,5 - tetrakis - (trifluoromethyl)imidazolidine with dimethyl sulfate.

Solid complexes may be formed from the compounds of this invention with solid or liquid complexing agents. Difunctional complexing agents such as diethyl oxalate, dimethyl malonate, diacetyl and benzil have been found most effective, but simpler compounds such as diethyl carbonate also form weak complexes. These complexes are usually isolated in a 1 to 1 molar ratio of compound to complexing agent, even if a molar excess of one of the materials is present. For example, a 1 to 1 complex, dec. 82–85° C., is formed if 4-imino-2,2,5,5-tetrakis-(trifluoromethyl)imidazolidine is recrystallized from an ether-pentane solution containing an excess of diethyl oxalate. The stability of a complex depends on the specific compound and complexing agent involved. Frequently the complexes tend to decompose or dissociate when heated or put into solution. The above mentioned thermal instability is usually evidenced by a wide melting range. Usually these complexes may be considered as single mixtures or solvates of the compound with complexing agent, and they are usually effective in the same applications as the parent compound.

Compounds in which R or X contain an amino moiety will form salts with acids such as hydrogen chloride, acetic acid, and the like, and with alkyl halides such as methyl iodide. Such salts are usually more water-soluble than the compounds from which they are derived but have the same general utilities. For the pharmacological purposes of the invention, it will be understood that the acids or bases used to form salts are to be pharmacologically acceptable.

The compounds are biologically active and cause striking pharmacological effects therapeutically useful in the treatment of neurological and psychiatric disorders. Thus, they exert depressant effect upon the central nervous system, decreasing skeletal muscle tone, a desirable property for treatment of hypertonic or hyperkinetic motor disorders. This property is also useful in causing relaxation in general anesthesia.

Preferred central nervous system depressants include those compounds in the above-defined active group in which any alkyl substituent contains 1–4 carbon atoms; any aryl, aralkyl or alkaryl substituent contains 6–8 carbon atoms; and any hydrocarbyloxycarbonyl substituent contains 1-13 carbon atoms.

This invention comprises pharmaceutical compositions containing the above-identified compounds.

DESCRIPTION OF THE INVENTION

Those compounds of my application Ser. No. 521,317 in which all halogen is chlorine or fluorine have psychotropic activity or are good muscle-relaxants and can be employed as such in warm-blooded animals. Tests for such pharmacological activities are described as follows:

An excellent method for demonstrating muscle-relaxant activity is the use of the 30° Inclined Screen Test of L. O. Randall et al. [J. Pharm. Exp. Therap., 129, 163 (1960)]. This test determines the dose which causes 50% of the test animals (mice) to lose their footing on a wire mesh which is inclined 30° from the horizontal. This is called the "paralyzing dose$_{50}$" or PD$_{50}$ value. In this test, low PD$_{50}$ values indicate high potencies.

Another method for demonstrating muscle-relaxant activity is the Wire Lift Test. The forefeet of albino mice are placed on a taut wire stretched at a level of approximately 12 inches over a flat surface. Normal animals grasp the wire and lift their hind feet to the wire, where balance is maintained. Inability to lift the hind legs to the wire is taken as a positive response and is considered to be a measure of muscle relaxation. This test determines the dose which imparts to 50% of the test animals (mice) an inability to lift their hind legs to the wire, and which is called the "effective dose$_{50}$" or ED$_{50}$ value. Dose response relationships and the calculation of PD$_{50}$ and ED$_{50}$ values were determined by the method of L. C. Miller and M. L. Tainter, Proc. Soc., Exp. Biol. Med. 57, 261–264 (1944).

An excellent method for demonstrating psychotropic (antipsychotic, antineurotic, antianxiety) activity is the Conditioned Avoidance Response Test in rats (R. Clark—"A Rapidly Acquired Avoidance Response in Rats," Psychonomic Science, 1966, 6 (1), 11–12). The animals are trained to avoid an electric shock to the feet by moving through a hole in a partition in response to a warning signal (light and sound) which precedes shock onset by 10 seconds. This test determines the dose which prevents 50% of the rats from avoiding the electric shock.

This is called the Avoidance Failure $ED_{50}$ value. In this test low $ED_{50}$ values indicate high potencies.

Another method for demonstrating psychotropic activity is the Exploratory Activity Test in mice. For this test, mice are individually placed on a stainless steel wire mesh screen (8" x 12", 3 mesh per inch, ¼" mesh, supported 1" above a laboratory bench) and observed for normal alert investigative activities, such as olfactory movements of the nose, head movements with apparent visual examination of the area and/or walking around on the screen. Normal mice will make these responses within 2 to 3 seconds. Absence or a marked depression of this activity within 5 seconds (particularly of the first 2 components) is considered loss of exploratory activity. This test determines the dose which causes a loss of exploratory activity in 50% of the mice. This is called the Exploratory Loss $ED_{50}$ value. In this test low $ED_{50}$ values indicate high potencies.

EMBODIMENTS OF THE INVENTION

There follow some non-limiting examples which illustrate the invention in detail.

Examples 1–27.—A number of tests were made, forming the examples of this application, in which compounds of application Ser. No. 521,317 were administered to mice to determine the $PD_{50}$ and $ED_{50}$ dosage values. As is well known in pharmacology, each series of toxicological data was taken to include at least one dose low enough so that all subjects survive and one dose high enough that none survive. Amounts between these two extremes were also taken and from the observed test results it is possible to calculate the $PD_{50}$ and $ED_{50}$ value by a graphic technique well known in pharmacology, that is, the method of Miller and Tainter referred to above. This method was used in obtaining the dosage values listed in the table which follows.

In the test system, the compounds were administered in single doses to groups of 5 to 10 mice at each of 4 or 5 dosage levels. The test animals were observed for the effects indicated at various time intervals ranging from 15 minutes to 24 hours after dosing. The doses were selected so as to bracket the $PD_{50}$ or the $ED_{50}$ value in degree of effect. The highest dose tested generally produced a maximal or near maximal effect. The lowest dose tested generally produced a minimal effect. All $PD_{50}$ and $ED_{50}$ values were determined at the time of peak effect for each compound. The compounds were prepared as solutions or suspensions in either an aqueous polyvinyl alcohol, gum acacia vehicle or an aqueous methylcellulose vehicle and administered at 10 to 25 milliliters per kilogram of animal body weight. All the compounds were given orally except for the Exploratory Activity Test in which test the compounds were given by intraperitoneal injection of an oil solution of the compound. Oral administration was accomplished by intubation, that is, by placing the desired dosage in aqueous medium in a syringe to which a short length of rubber tubing is attached and inserting the free end of the tube into the mouth of the test animal and down to the stomach. The dosage was then expelled from the syringe directly into the stomach through the tubing. The results of the tests are given as examples in the following table.

TABLE I.—RESULTS OF TESTS FOR MUSCLE RELAXANT AND PSYCHOTROPIC ACTIVITY

| Example | Compound | Inclined screen $PD_{50}$ (mg./kg.) | Wire lift $ED_{50}$ (mg./kg.) | Explor. loss $ED_{50}$ (mg./kg.) | Avoidance failure $ED_{50}$ (mg./kg.) |
|---|---|---|---|---|---|
| 1 | 4-imino-2,2,5,5-tetrakis(trifluoro-methyl)imidazolidine (1B, 2)[1] | 10.6±0.9 | 7.0±0.51 | 12 | 1.5 |
| 2 | 4-imino-2,5-bis(difluoromethyl)-2,5-bis(trifluoromethyl)imidazolidine (5). | 17.3±1.3 | 10.0±0.83 | 7 | 3.0 |
| 3 | 4-imino-3-methyl-2,2,5,5-tetrakis(trifluoromethyl)imidazolidine (7). | 20.5±1.7 | 13.0±1.3 | 20 | 3.5 |
| 4 | 3-methyl-4-methylimino-2,2,5,5-tetrakis(trifluoromethyl)imidazolidine (7). | 30.0±3.3 | 19.5±2.3 | 20 | 2.8 |
| 5 | 3-ethyl-4-imino-2,2,5,5-tetrakis(trifluoromethyl)imidazolidine (8). | 17.0±1.4 | 12.3±1.0 | 20 | [2] |
| 6 | 4-dimethylamino-2,2,5,5-tetrakis(trifluoromethyl)-3-imidazoline (9). | >30 | 20.0 | 20 | [2] |
| 7 | 3-ethyl-4-ethylimino-2,2,5,5-tetrakis(trifluoromethyl)imidazolidine (10). | 57.0±14.0 | 30.0±3.9 | 100 | [2] |
| 8 | 4-ethylamino-2,2,5,5-tetrakis(trifluoromethyl)-3-imidazoline (10). | 17.5±2.4 | 8.3±0.75 | 12 | [2] |
| 9 | 3-ethyl-4-methylimino-2,2,5,5-tetrakis(trifluoromethyl)imidazolidine (11). | [2] | 30.0±3.3 | 20 | [2] |
| 10 | 4-ethylimino-3-methyl-2,2,5,5-tetrakis(trifluoromethyl)imidazolidine (12). | [2] | 22.0±1.6 | 36 | [2] |
| 11 | 4-benzylamino-2,2,5,5-tetrakis(trifluoromethyl)-3-imidazoline (13). | 45.0±7.6 | 30.0±5.4 | 36 | [2] |
| 12 | 4-allylamino-2,2,5,5-tetrakis(trifluoromethyl)-3-imidazoline (15). | 41.0±4.8 | 28.0±3.0 | 60 | 8.6 |
| 13 | 4-methylamino-2,2,5,5-tetrakis(trifluoromethyl)-3-imidazoline (16). | 18.8±1.3 | 10.8±0.86 | 12 | 2.1 |
| 14 | 4-hydroxymethylamino-2,2,5,5-tetrakis(trifluoromethyl)imidazoline (20). | 13.2±1.6 | 5.6±0.85 | 12 | 4.0 |
| 15 | 4-hydroxymethoxymethylamino-2,2,5,5-tetrakis(trifluoromethyl)-3-imidazoline (21). | 16.0±1.3 | 7.6±1.0 | 12 | [2] |
| 16 | 4-(N-pyrrolidylmethylamino)-2,2,5,5-tetrakis(trifluoromethyl)-3-imidazoline hydrochloride (23). | 18.8±1.7 | 10.5±0.7 | 12 | [2] |
| 17 | 4-dimethylaminomethylamino-2,2,5,5-tetrakis(trifluoromethyl)-3-imidazoline (26). | 22.0±1.8 | 10.0±1.1 | 12 | [2] |
| 18 | 4-dimethylaminomethylamino-2,2,5,5-tetrakis(trifluoromethyl)-3-imidazoline hydrochloride (27). | 19.2±1.2 | 7.5±1.2 | 7 | [2] |
| 19 | 4-acetylimino-2,2,5,5-tetrakis-(trifluoromethyl)imidazolidine (30). | 24.0±1.9 | 13.4±1.1 | 12 | 4.0 |
| 20 | Tetramethylammonium salt of 4-acetyl-imino-2,2,5,5-tetrakis(trifluoromethyl)-imidazolidine (31). | 16.0±1.6 | 8.8±1.03 | 12 | [2] |
| 21 | 4-chloroacetylimino-2,2,5,5-tetrakis(trifluoromethyl)imidazolidine (32). | 16.5±1.4 | 9.8±0.77 | 7 | [2] |
| 22 | 4-acetylimino-3-methyl-2,2,5,5-tetrakis(trifluoromethyl)imidazolidine (34). | 24.0±2.5 | 15.0±0.85 | 60 | 4.0 |
| 23 | 4-(heptanoylimino)-2,2,5,5-tetrakis-(trifluoromethyl)imidazolidine (39). | 28.5±2.9 | 10.0±0.6 | 20 | [2] |
| 24 | 4-(carbethoxyimino)-2,2,5,5-tetrakis(trifluoromethyl)imidazolidine (43). | 14.5±1.4 | 10.2±0.87 | 7 | [2] |
| 25 | 4-(carbomethoxyimino)-2,2,5,5-tetrakis(trifluoromethyl)imidazolidine (44). | 17.0±1.0 | 11.5±1.1 | 7 | 2.9 |
| 26 | 4-(2-dimethylaminoethoxycarbonyl-imino)-2,2,5,5-tetrakis(trifluoromethyl)imidazolidine (45). | 33.5±3.2 | 19.2±1.9 | 20 | [2] |
| 27 | 4-N-pyrrolidylmethylamino-2,5-bis(difluoromethyl)-2,5-bis-(trifluoromethyl)-3-imidazoline (29). | >30 | 7.8±1.1 | 7 | [2] |

[1] The numbers in parentheses after the names of the compounds are the numbers of the examples in which the compound is described in my copending application Serial No. 521,317.
[2] Not available.

While the preceding examples show the use of intubation and parenteral injection, it is understood the compounds can be administered to a living body by all methods known in pharmacy and medicine. They can be given orally in capsules, elixirs, syrups and the like and parenterally in solution in suitable liquid carriers. The dosage will vary and will depend on such factors as the condition being treated; age and weight of the recipient; the responsiveness of the recipient; prior, concurrent and intended subsequent medication and treatment; general health of the recipient, frequency of treatment; and of course the nature of the effect desired.

Generally speaking, the active compound will be administered in a pharmacologically beneficial amount. Administration can be in a single dose or in a plurality of doses over an extended period of time. It will of course also be understood that in a course of treatment, an initial dose can be in greater amounts if appropriate to obtain a rapid response. Thereafter the minimally effective dosage, or maintenance dosage, is determined.

A single dose will rarely exceed about 10 to 20 milligrams of active compound per kilogram within this invention, although larger amounts can be used as called for in any given situation. Extremely small doses will effect some benefit but as a practical matter a single dose of less than about 0.001 to 0.002 milligram per kilogram will seldom be used. Ordinarily, doses will range from 0.05 to 10 mg./kg. and preferably 0.05 to 5 mg./kg. Doses can be repeated in the same or greater or lesser amounts over a period of time as long as improvement in the recipient is observed or as long as needed under the circumstances.

The compound will ordinarily be administered with a nontoxic pharmaceutical carrier in a variety of practical dosage forms. These dosage forms are novel compositions comprising the nontoxic pharmaceutical carrier and a physiologically beneficial amount of the active compound.

Suitable nontoxic pharmaceutical carriers or vehicles include liquids such as water, aromatic water, alcohols, syrups, elixirs, pharmaceutical mucilages, such as those containing acacia and tragacanth, oils of petroleum, animal, vegetable or synthetic origin, for example peanut oil, soybean oil, fish oil such as cod liver oil, or the like, for oral administration; water, saline, aqueous lactose, aqueous maltose, aqueous glucose (dextrose), aqueous sucrose, fixed oils, and the like, for administration by injection. Suitable solid carriers include soft gelatin capsules, hard gelatin capsules, slow or delayed release pills or capsules, powders, tablets, and the like. Suitable solid or liquid nontoxic pharmaceutical carriers are well known in the art and the selection of carrier can be from those appropriate and available in accordance with well-known prescription techniques. The compositions of this invention therefore include such dosage forms as solutions, suspensions, syrups, elixirs, tablets, capsules, powder packets, and the like.

A vast number of suitable pharmaceutical carriers are described in "Remington's Pharmaceutical Sciences" by E. W. Martin, a well-known reference text in this field.

In these novel compositions the new active compounds of this invention will be present in a pharmacologically beneficial amount as mentioned above. In practice, this means that the active ingredient will ordinarily constitute at least about 0.001% by weight based on the total weight of the composition. For oral administration in liquid medium such as an elixir, the concentration will ordinarily be in the range from about 0.01–2.0% by weight of active ingredient. For injectable compositions concentrations from 0.005–0.5% are satisfactory. In tablets, powders, capsules and the like, the amount of active ingredient may, if desired, be as much as 10 to 50% or more by weight of the total composition. For oral administration as a solution in oil in a soft gelatin capsule, concentrations of 0.05% to 10% by weight of active ingredient and 99.05% to 90% by weight of a pharmaceutically acceptable oil will ordinarily suffice. The preferred concentrations will be 0.2% to 5% by weight of active ingredient and 99.8% to 95% by weight of the oil.

The active compounds of this invention can be formulated, if desired, with one or more pharmaceutically active materials for combination effects, treatments and benefits. Such materials include but are by no means limited to antidepressants or stimulants, vitamins, analgesics, tranquilizers, antibiotics, antitussive agents, etc. The compositions can, of course, contain suitable pharmaceutical modifiers such as coloring agents, sweetening or other flavoring agents, solubilizing agents, etc., as will readily occur to persons skilled in this art.

The following further examples and embodiments illustrate specific pharmaceutical compositions for administration to a living body:

Example 28.—4 - imino - 2,2,5,5 - tetrakis(trifluoromethyl)imidazolidine is formulated conveniently in 20% by volume ethyl alcohol USP-water in 0.05% by weight concentration for oral administration, with and without a flavoring agent, and a coloring agent, etc.; and in 0.05, 1, 5, 10 and 25 milligram amounts in standard two-piece hard gelatin capsules with a diluent such as starch, mannitol or lactose, for oral administration. In pharmacologic applications it is administered in these dosage forms at dosage levels in the range of 0.5 to 100 milligrams, as described above.

Similar formulations are made with 4-imino-3-methyl-2,2,5,5 - tetrakis(trifluoromethyl)imidazolidine and 3-ethyl - 4 - imino - 2,2,5,5 - tetrakis(trifluoromethyl)imidazolidine.

Example 29.—4 - imino - 2,2,5,5 - tetrakis(trifluoromethyl)imidazolidine can be formulated for oral administration with suitable tableting adjuvants using a conventional tableting machine with the active ingredient constituting 1–50% by weight of the tablet. Other ingredients include gelatin, magnesium stearate, and starch or mannitol as described in the foregoing Martin reference.

Formulations of the type illustrated by Example 29 are also made with any of the active solid compounds of this invention.

Example 30.—4 - amino - 2,2,5,5 - tetrakis(trifluoromethyl)-3-imidazoline can be formulated for oral administration in a soft gelatin capsule. Each capsule contains the following ingredients:

| | Mg. |
|---|---|
| (1) Active ingredient | 5.0 |
| (2) Soybean oil, refined | 212.0 |
| (3) Gelatin | 74.190 |
| (4) Glycerin | 36.167 |
| (5) Water | 7.117 |
| (6) Methylparaben | 0.297 |
| (7) Propylparaben | 0.074 |
| (8) FD&C Yellow No. 5 | 0.122 |
| (9) Titanium dioxide | 0.541 |

The active ingredient is dissolved in soybean oil at 140° C., the solution is cooled and injected by means of a positive displacement pump into the gelatin (which contains the other ingredients) to form the capsule. The capsules are washed in petroleum ether and dried.

The concentration of active ingredient in oil can be varied to provide other dosage strengths. Other pharmaceutically acceptable oils can be used such as: peanut oil, cottonseed oil, corn oil and the like.

Example 31.—4 - amino - 2,2,5,5 - tetrakis(trifluoromethyl)-3-imidazoline can be formulated for intramuscular injection by dissolving the compound in corn oil or sesame oil in concentrations of 0.1% to 1% (wt./vol.). In addition, 2 to 3% by volume of benzylalcohol, N.F. may be included in the solution. The solution is clarified by filtration, placed in glass ampoules, sealed, and then sterilized by heating to 160° C.

Example 32.—No. 5 two-piece hard gelatin capsules for oral use can be filled with 110 mg. of a mixture consisting of 1.0 mg. of 4-imino-2,2,5,5-tetrakis(trifluoromethyl)imidazolidine, 0.2 mg. of the finely divided, fumed silicon dioxide known commercially as Cab-O-Sil® and approximately 109 mg. of lactose.

Any of the active compounds of this invention can be used in formulations of the type illustrated by Example 32.

Example 33.—A flavored elixir containing 1 mg. of 4-imino-2,2,5,5 - tetrakis(trifluoromethyl)imidazolidine in every 5 ml. can be prepared by dissolving the compound in a flavored solution of sorbitol containing up to 50% of ethyl alcohol USP so that the final concentration is 0.02% weight/volume.

The disclosure herein should not be taken as a recommendation to use the disclosed invention in any way without full compliance with U.S. Food and Drug Laws and other laws and governmental regulations which may be applicable.

Since obvious modifications and equivalents in the invention will be evident to those skilled in the chemical and pharmaceutical arts, I propose to be bound solely by the appended claims.

The embodiments of the invention in which an exclusive property of privilege is claimed are defined as follows:

1. A pharmaceutical composition containing an effective amount of psychotropic or muscle-relaxant compound selected from the group consisting of:

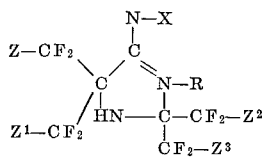

and

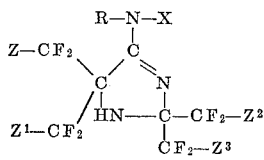

wherein:
(A) R is hydrogen or alkyl;
(B) X is selected from the group consisting of:
—C(CF$_3$)$_2$NH$_2$; hydrogen; alkyl; benzyl, carbethoxymethyl; lower alkenyl; dimethylaminoethyl; lower alkynyl; cyclohexyl; cyclohexenyl; lower alkyl substituted with 1 halogen or 1 lower alkoxy; hydroxymethyl; hydroxymethoxymethyl; N-pyrrolidylmethyl; N-piperidylmethyl; N-morpholinylmethyl; or dimethylaminomethyl;

where Q is alkyl; lower alkyl substituted with up to 3 halogens or 1 lower alkoxy; phenyl; phenyl substituted with up to 3 halogen, 2 lower alkyl, 1 lower alkoxy, 1 amino or 1 lower alkyl-substituted amino; 2,4-dichlorophenoxymethyl; lower alkenyl; naphthyl; or amino(lower alkyl) or alkyl-substituted amino(lower alkyl) where the substituents are alkyl of 1–4 carbons and

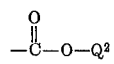

where Q$^2$ is lower alkyl; cyclohexyl; or

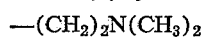

and
(C) Z, Z$^1$, Z$^2$ and Z$^3$, alike or different, are selected from the group consisting of hydrogen and fluorine; and
(D) with the provisos that R and X together are of no more than 30 carbons and any halogen is chlorine or fluorine; and
a nontoxic pharmaceutical carrier therefor.

2. A pharmaceutical composition of claim 1 wherein the psychotropic or muscle-relaxant compound is 4-amino-2,2,5,5 - tetrakis(trifluoromethyl)-3-imidazoline, its tautomer 4 - imino-2,2,5,5-tetrakis(trifluoromethyl)imidazolidine, and mixtures thereof.

3. A pharmaceutical composition of claim 1 wherein the psychotropic or muscle-relaxant compound is 4-imino-3-methyl-2,2,5,5-tetrakis(trifluoromethyl)imidazolidine.

4. A pharmaceutical composition of claim 1 wherein the phychotropic or muscle-relaxant compound is 3-methyl-4-methylimino - 2,2,5,5 - tetrakis(trifluoromethyl)imidazolidine.

5. A pharmaceutical composition of claim 1 wherein the psychotropic or muscle-relaxant compound is 3-ethyl-4-imino-2,2,5,5-tetrakis(trifluoromethyl)imidazolidine.

6. A pharamaceutical composition of claim 1 wherein the psychotropic or muscle-relaxant compound is 4-imino-2,5-bis(difluoromethyl - 2,5 - bis(trifluoromethyl)imidazolidine.

7. A pharmaceutical composition of claim 1 wherein the psychotropic or muscle-relaxant compound is 4- methylamino - 2,2,5,5 - tetrakis(trifluoromethyl)-3-imidazoline.

8. A pharmaceutical composition of claim 1 wherein the psychotropic or muscle-relaxant compound is 4-benzylamino - 2,2,5,5 - tetrakis(trifluoromethyl)-3-imidazoline.

9. A pharmaceutical composition of claim 1 wherein the psychotropic or muscle-relaxant compound is 4-allylamino-2,2,5,5-tetrakis(trifluoromethyl)-3-imidazoline.

10. A pharmaceutical composition of claim 1 wherein the psychotropic or muscle-relaxant compound is 4-acetylimino-3-methyl - 2,2,5,5 - tetrakis(trifluoromethyl)imidazoline.

11. A pharmaceutical composition of claim 1 wherein the psychotropic or muscle-relaxant compound is 4-hydroxymethylamino - 2,2,5,5 - tetrakis(trifluoromethyl)-3-imidazoline.

12. A pharmaceutical composition of claim 1 wherein the psychotropic or muscle-relaxant compound is 4-(chloroacetylimino) - 2,2,5,5 - tetrakis(trifluoromethyl)imidazolidine.

13. A pharmaceutical compositon of claim 1 wherein the phychotropic or muscle-relaxant compound is 4-(carbethoxyimino) - 2,2,5,5 - tetrakis(trifluoromethylimidazolidine.

14. A pharmaceutical composition of claim 1 wherein the psychotropic or muscle-relaxant compound is 4-(carbomethoxyimino) - 2,2,5,5 - tetrakis(trifluoromethyl)imidazolidine.

15. A pharmaceutical composition for oral administration consisting of a soft elastic capsule containing a clear solution of an effective amount of a compound of claim 1 in a pharmaceutically acceptable oil.

16. A pharmaceutical composition for oral administration consisting of a soft elastic capsule containing a clear solution of an effective amount of a compound of claim 2 in a pharmaceutical acceptable oil.

17. A method of inducing a psychotropic effect or muscle relaxation comprising administering to a living warm blooded animal an effective amount of a composition of claim 1.

18. A method of inducing a psychotropic effect or muscle relaxation comprising administering to a living warm blooded animal an effective amount of a composition of claim 2.

References Cited

UNITED STATES PATENTS 2,915,528 12/1959 Raifsnider _____ 260—309.6
3,310,570 3/1967 Middleton _____ 260—299

STANLEY J. FRIEDMAN, Primary Examiner

U.S. Cl. X.R.

424—248, 267

PO-1050
(5/69)

UNITED STATES PATENT OFFICE
CERTIFICATE OF CORRECTION

Patent No. __3,567,831__    Dated __March 2, 1971__

Inventor(s) __William J. Middleton__

It is certified that error appears in the above-identified patent and that said Letters Patent are hereby corrected as shown below:

Col. 2, line 30, "existing" should read -- exist in

Col. 9, line 30, the structural formula should be

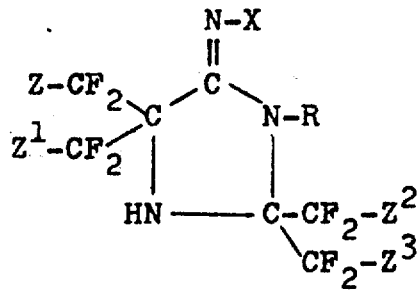

Signed and sealed this 7th day of September 1971.

(SEAL)
Attest:

EDWARD M. FLETCHER, JR.
Attesting Officer

ROBERT GOTTSCHLAK
Acting Commissioner of Pa